(12) United States Patent
Lebaredian et al.

(10) Patent No.: US 8,276,133 B1
(45) Date of Patent: Sep. 25, 2012

(54) SYSTEM, METHOD, AND COMPUTER PROGRAM PRODUCT FOR DETERMINING A PLURALITY OF APPLICATION SETTINGS UTILIZING A MATHEMATICAL FUNCTION

(75) Inventors: Rev Lebaredian, Austin, TX (US); John F. Spitzer, Wimberley, TX (US); Vasiliy Skvortsov, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 1276 days.

(21) Appl. No.: 12/001,504

(22) Filed: Dec. 11, 2007

(51) Int. Cl.
*G06F 9/45* (2006.01)
(52) U.S. Cl. ...................................... 717/153
(58) Field of Classification Search .............. 717/153; 463/43
See application file for complete search history.

(56) References Cited

U.S. PATENT DOCUMENTS

| | | | |
|---|---|---|---|
| 5,958,058 A * | 9/1999 | Barrus ........................... 713/320 |
| 6,044,476 A | 3/2000 | Ote et al. |
| 6,646,653 B2 * | 11/2003 | San et al. ......................... 463/43 |
| 6,753,881 B1 | 6/2004 | Callway et al. |
| 6,768,519 B2 | 7/2004 | Fujita et al. |
| 6,847,358 B1 | 1/2005 | Ford et al. |
| 6,901,580 B2 * | 5/2005 | Iwanojko et al. ............... 717/121 |
| 7,034,828 B1 | 4/2006 | Drebin et al. |
| 7,080,247 B2 | 7/2006 | Rochford, II et al. |
| 7,293,201 B2 | 11/2007 | Ansari |
| 7,603,445 B1 * | 10/2009 | Fehrle ........................... 709/220 |
| 7,626,944 B1 | 12/2009 | Riddle |
| 2001/0008021 A1 | 7/2001 | Ote et al. |
| 2002/0073415 A1 | 6/2002 | Kim et al. |
| 2002/0083228 A1 | 6/2002 | Chiloyan et al. |
| 2002/0095501 A1 | 7/2002 | Chiloyan et al. |
| 2003/0140333 A1 * | 7/2003 | Odaka et al. ................... 717/115 |
| 2004/0187103 A1 | 9/2004 | Wickham et al. |
| 2004/0212610 A1 | 10/2004 | Hamlin |
| 2005/0104888 A1 | 5/2005 | Ford et al. |
| 2005/0225639 A1 | 10/2005 | Somers |
| 2006/0132473 A1 | 6/2006 | Fuller et al. |
| 2007/0002347 A1 | 1/2007 | Lai et al. |
| 2007/0066403 A1 * | 3/2007 | Conkwright ..................... 463/43 |
| 2007/0098288 A1 | 5/2007 | Raskar et al. |
| 2007/0172140 A1 | 7/2007 | Kokemohr |
| 2007/0268204 A1 | 11/2007 | Kawabe |
| 2008/0005611 A1 | 1/2008 | Solyanik |
| 2008/0072077 A1 | 3/2008 | Orr |
| 2008/0102957 A1 * | 5/2008 | Burman et al. .................. 463/42 |
| 2008/0133067 A1 * | 6/2008 | DeMay ............................. 701/1 |
| 2008/0270569 A1 | 10/2008 | McBride et al. |
| 2009/0069084 A1 * | 3/2009 | Reece et al. ..................... 463/32 |
| 2009/0115778 A1 | 5/2009 | Ford et al. |

OTHER PUBLICATIONS

Ribeiro-Filho et al., "GAME—A Framework for Programming Genetic Algorithm Applications", 1994, IEEE.*
U.S. Appl. No. 12/001,669, filed Dec. 11, 2007.
U.S. Appl. No. 12/001,503, filed Dec. 11, 2007.
Lebaredian et al., U.S. Appl. No. 11/958,266, filed Dec. 17, 2007.

(Continued)

*Primary Examiner* — Wei Zhen
*Assistant Examiner* — Junchun Wu
(74) *Attorney, Agent, or Firm* — Zilka-Kotab, PC (57) ABSTRACT

A system, method, and computer program product are provided for determining a plurality of application settings utilizing a mathematical function. In operation, a plurality of application parameters are identified. Additionally, the application parameters are defined as a mathematical function. Furthermore, a plurality of application settings are determined utilizing the mathematical function.

20 Claims, 7 Drawing Sheets

OTHER PUBLICATIONS

Non-Final Office Action from U.S. Appl. No. 11/958,266 dated Feb. 23, 2010.
Final Office Action from U.S. Appl. No. 11/958,266 dated Oct. 19, 2010.
Non-Final Office Action from U.S. Appl. No. 12/001,669 dated Feb. 17, 2011.
Advisory Action from U.S. Appl. No. 11/958,266, dated Feb. 22, 2012.
Final Office Action from U.S. Appl. No. 11/958,266, dated Dec. 12, 2011.
Non-Final Office Action from U.S. Appl. No. 11/958,266 dated Jun. 21, 2011.
Final Office Action from U.S. Appl. No. 12/001,669 dated Jul. 21, 2011.
Notice of Allowance from U.S. Appl. No. 11/958,266, dated Jul. 2, 2012.
Non-Final Office Action from U.S. Appl. No. 12/001,669, dated May 11, 2012.

* cited by examiner

SYSTEM, METHOD, AND COMPUTER PROGRAM PRODUCT FOR DETERMINING A PLURALITY OF APPLICATION SETTINGS UTILIZING A MATHEMATICAL FUNCTION

FIELD OF THE INVENTION

The present invention relates to application operation, and more particularly to optimizing application operation for a system.

BACKGROUND

One of the greatest strengths of a personal computer (PC) platform is its heterogeneity. PCs generally include components from different manufacturers such as different central processing units (CPUs), video cards, motherboards, etc. Furthermore, each PC may have different drivers and software installed. This heterogeneity shortens the cycles for new hardware availability, giving PCs a performance and feature set edge over fixed consoles (e.g. game consoles).

Fixed consoles such as game consoles (e.g. Sony PlayStation®, XBox, etc.) are extremely homogeneous. All consoles from a given generation are identical. This results in a longer time cycle between releases of generations of consoles, generally about 4 years. However, this homogeneity is a great advantage for application developers. For example, when developing games for game consoles, game developers can be sure that their code will run on a system of an end-user in exactly the same manner as it does on a development system.

Unlike the PC platform, the game developers for game consoles only need to test a single platform. Because of the homogeneity of the game console, there are no concerns with different drivers, different amounts of memory, different graphics processing units (GPUs), etc. Furthermore, the game developers never need to be concerned about future-proofing their software so hardware released after their game is released will run properly.

PC game developers, like other PC application developers, want to insure that a game will run on as many PCs as possible. Unfortunately, most game developers do not have the resources to do quality assurance on even the most popular PC configurations. The quality assurance processes for PC game developers are generally biased toward testing as much of the game as possible (e.g. different levels, maps, scenarios, etc.). As a result, default settings for in-game parameters in most PC games are set to the lowest common denominator. PC game developers want to make sure that the game will run on any PC, and lacking the significant resources to test the myriad of hardware combinations, the lowest common denominator is their only option. Additionally, in-game settings are seldom changed by a user in order to maximize performance due to complexity, lack of accessibility, and/or other issues.

There is thus a need for addressing these and/or other issues associated with the prior art.

SUMMARY

A system, method, and computer program product are provided for determining a plurality of application settings utilizing a mathematical function. In operation, a plurality of application parameters are identified. Additionally, the application parameters are defined as a mathematical function. Furthermore, a plurality of application settings are determined utilizing the mathematical function.

DETAILED DESCRIPTION

Figure 1:
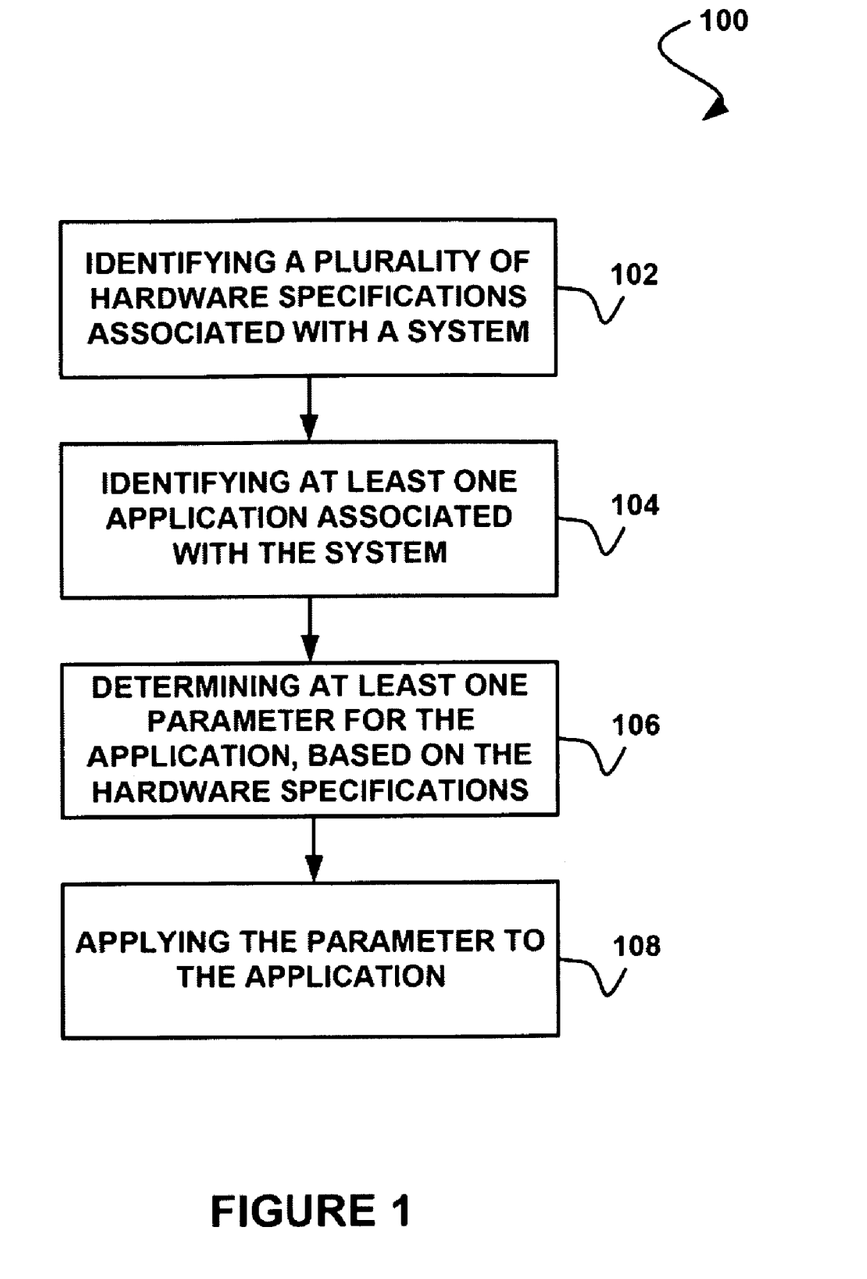
FIG. 1 shows a method for determining parameters for an application based on hardware specifications, in accordance with one embodiment.

FIG. 1 shows a method 100 for determining parameters for an application based on hardware specifications, in accordance with one embodiment. As shown, a plurality of hardware specifications associated with a system are identified. See operation 102. In the context of the present description, a system refers to any system capable of utilizing or running an application. For example, in various embodiments, the system may include, but is not limited to, a computer (e.g. a desktop, a laptop, a server, a personal computer, etc.), a personal digital assistant (PDA), a mobile phone, a gaming device, and/or any other system that meets the above definition.

Additionally, hardware specifications refer to any characteristic of a system component. For example, in one embodiment, the hardware specifications may relate to a component or a plurality of different hardware components of the system. In this case, the hardware components may include a graphics processor, a central processor, memory, and/or any other component associated with the system.

Additionally, at least one application associated with the system is identified. See operation 104. In the context of the present description, an application refers to any software that employs the capabilities of a system. For example, in various embodiments, the application may include, but is not limited to, a gaming application, a graphics application, a word processing application, a media playing application, and/or any other application that meets the above definition.

Furthermore, at least one parameter for the application is determined based on the hardware specifications. See operation 106. In the context of the present description, a parameter refers to any modifiable and/or selectable information associated with an application. For example, in various embodiments, a parameter may include, but is not limited to, an application setting (e.g. sound quality, etc.), a graphics parameter (e.g. anti-aliasing, resolution, glow, high dynamic range (HDR) quality, filtering, grass, texture resolution, water quality, sound, etc.), an application input, a driver, a patch, and/or any other parameter that meets the above definition.

Still yet, the parameter is applied to the application. See operation 108. In one embodiment, the parameter may be conditionally applied to the application, based on user approval. In another embodiment, the parameter may be automatically applied.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
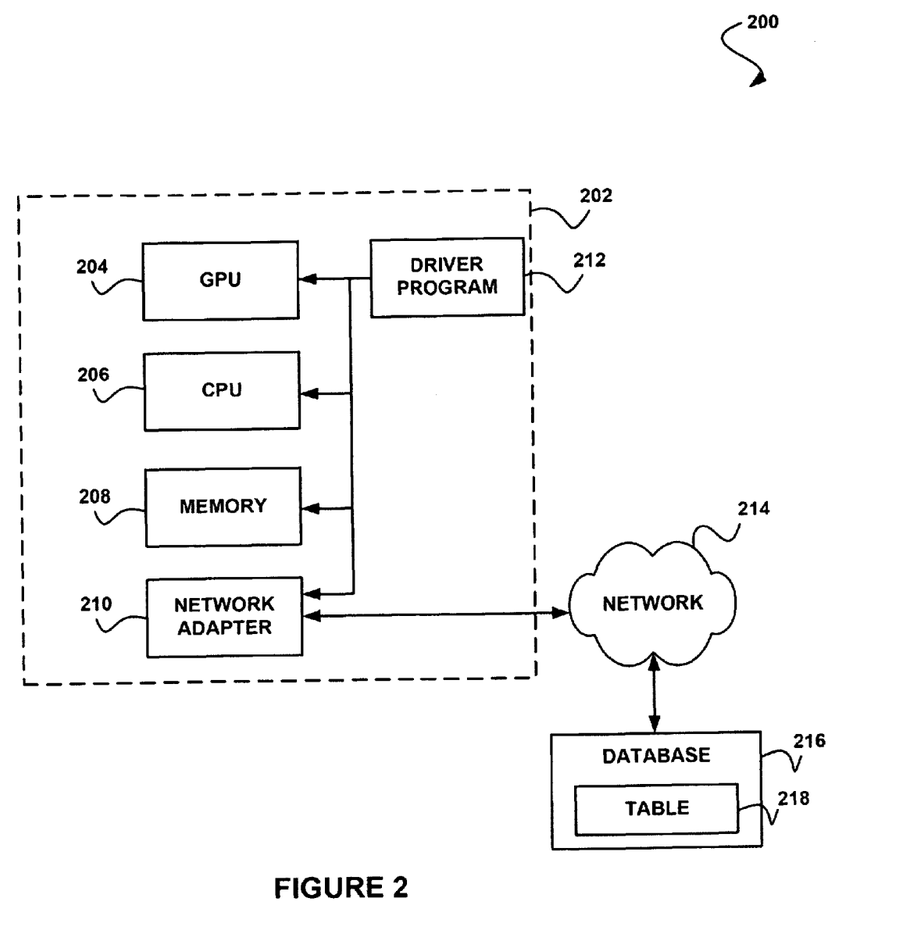
FIG. 2 shows a system for determining parameters for an application based on hardware specifications, in accordance with one embodiment.

FIG. 2 shows a system 200 for determining parameters for an application based on hardware specifications, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, a subsystem 202 may include a graphics processing unit (GPU) 204, a central processing unit (CPU) 206, memory 208, a network adaptor 210, and a driver 212. In operation, hardware specifications associated with the subsystem 202 are identified. In this case, the hardware specifications may include information associated with the GPU 204, the CPU 206, the memory 208, the network adaptor 210, and/or any other hardware component of the subsystem 202. In one embodiment, the hardware specifications may include driver, or software information (e.g. driver updates, patches, etc.) corresponding to a component.

Additionally, at least one application (not shown) associated with the subsystem 202 is identified. Once an application is identified, at least one parameter for the application is determined based on the hardware specifications. In this case, the parameter may be determined by querying a database of parameters 216.

As an option, and as shown in FIG. 2, the database of parameters 216 may be queried over a network 214. In various embodiments, the network 214 may take any form including, but not limited to a local area network (LAN), a wireless network, a wide area network (WAN) such as the Internet, peer-to-peer network, etc. Although the database of parameters 216 is shown to be queried over the network 214, in another embodiment the database 216 may be local to the subsystem 202. In this case, the query would involve a local query.

As shown further, the database 216 may include a table 218 including available parameters. As an option, these parameters may be organized based on hardware specifications of components and an associated application. For example, the table 218 may include hardware specifications and optimized application settings corresponding to the particular hardware specifications.

Thus, a query from the subsystem 202 may include information relating to the hardware specifications and the application associated with the subsystem 202. Parameters for the application associated with the subsystem 202 may then be determined based on information contained in the table 218. In various embodiments, any number of data structures may be stored in the database 216.

In one embodiment, identifying the application associated with the subsystem 202 and determining the parameters for the application may be performed by an application program installed in conjunction with a driver 212. In this case, the application program may be conditionally installed in conjunction with the driver 212, based on user approval. Furthermore, an application program interface (API) associated with the application program may be utilized to set and query parameters associated with an application. Additionally, it should be noted that various other APIs provided by an operating system (OS), drivers, etc., may be used to identify the hardware specifications and/or any applications associated with the subsystem 202.

As an option, the application program may also be utilized to determine updateable information for the application associated with the subsystem 202 (e.g. patches, software updates, application updates, etc.). In this case, the updateable information may be determined based on the hardware specification.

Once the parameter or parameters are determined, the parameters are applied to the application associated with the subsystem 202. In this case, the parameter may be applied by configuring the application associated with the subsystem 202. Furthermore, applying the parameter may tailor operation of the application associated with the subsystem 202 to accommodate the hardware specifications.

For example, the application associated with the subsystem 202 may be a game application. In this case, information associated with the game application and hardware specifications associated with the subsystem 202 may be included in a query to the database 216. Optimized settings for the game, based on the hardware specifications of the subsystem 202, may then be determined using information stored in the database 216. Such parameters may then be applied to the game application.

Figure 3:
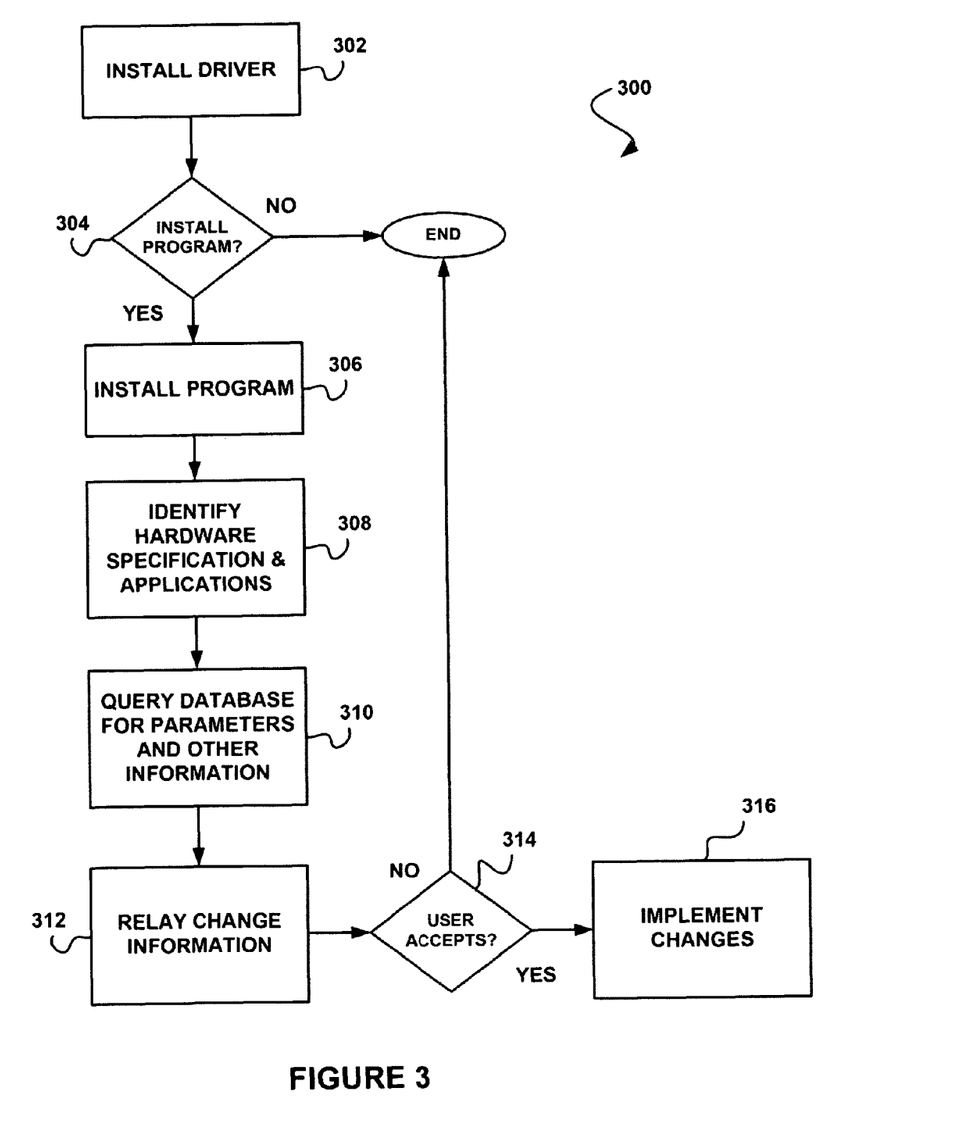
FIG. 3 shows a method for installing an application program used for determining parameters for an application based on hardware specifications, in accordance with one embodiment.

FIG. 3 shows a method 300 for installing an application program used for determining parameters for an application based on hardware specifications, in accordance with one embodiment. As an option, the present method 300 may be implemented in the context of the functionality and architecture of FIGS. 1-2. Of course, however, the method 300 may be carried out in any desired environment. Again, the aforementioned definitions may apply during the present description.

As shown, a driver is installed on a system. See operation 302. In the context of the present description, a driver refers to any software that allows other software or programs to interact with hardware of a system. As part of the driver installation process, it is determined whether an application program is to be installed. See operation 304. In this case, such determination may be made by a user who is installing the driver. Furthermore, the application program to be installed is used for determining parameters for an application on a system based on hardware specifications of the system. It should be noted that, in another embodiment, operation 302 may be omitted. For example, the program may be installed without the installation of the driver.

If it is determined that the application program is to be installed, the program is installed on the system. See operation 306. Once the program is installed, the program is utilized to identify hardware specifications of components associated with the system, and applications associated with the system. See operation 308.

Once identified, a database is queried for parameters and other information associated with the identified applications and the hardware specifications. See operation 310. Such parameters may include any setting, patch, update, etc. associated with an application (e.g. games, etc.). Furthermore, the information may include any updateable or configurable information associated with the system (e.g. patches, software updates, driver updates, etc.).

Information resulting from the query corresponding to the parameters or other information is then relayed to the system. See operation 312. A user operating the system may then be prompted to accept or decline the changes. See operation 314.

If the user accepts, the changes are implemented. See operation 316. For example, upon acceptance, the application associated with the system (e.g. a game, etc.) may be configured with parameters determined based on the hardware specifications.

It should be noted that, the parameters for the application may be determined in various ways. In one embodiment, the parameter for the application may be determined utilizing a mathematical function. More detailed information regarding such determination is set forth below.

Figure 4:
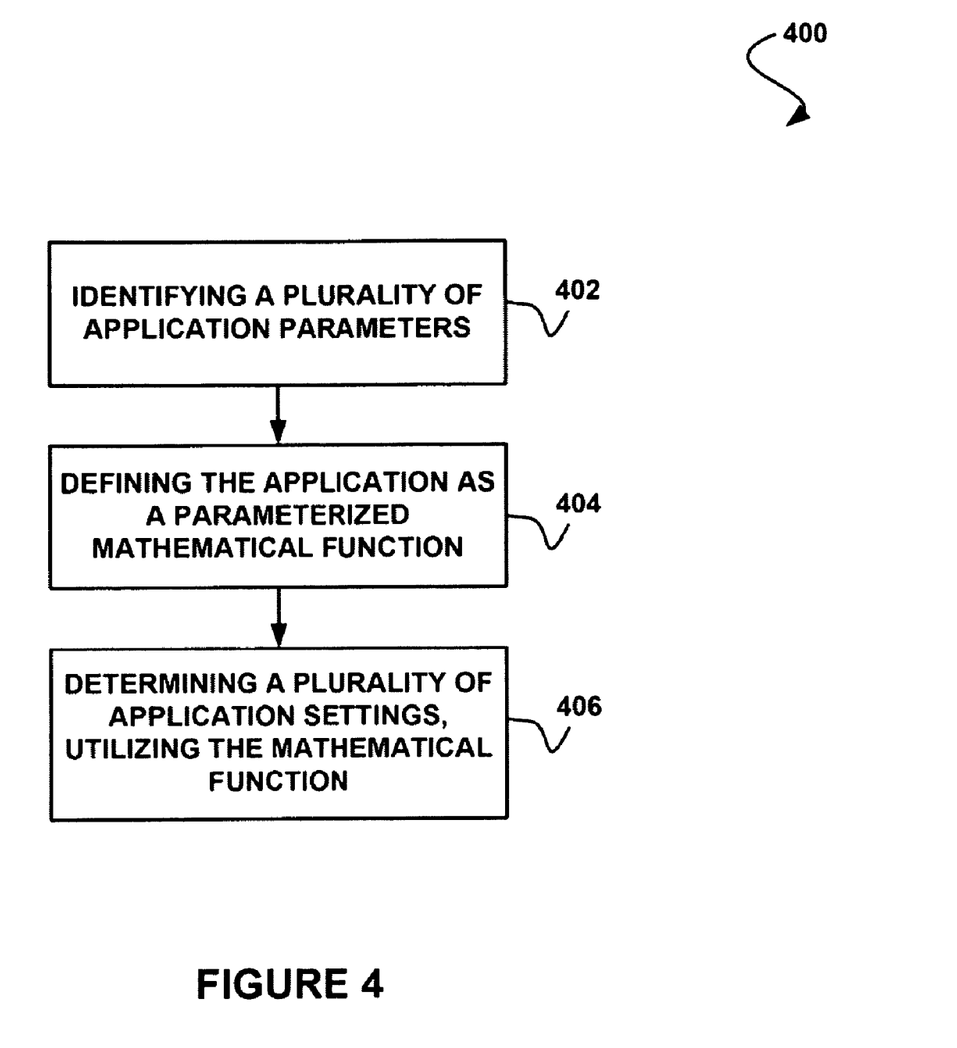
FIG. 4 shows a method for determining a plurality of application settings utilizing a mathematical function, in accordance with one embodiment.

FIG. 4 shows a method 400 for determining a plurality of application settings utilizing a mathematical function, in accordance with one embodiment. As an option, the present method 400 may be implemented in the context of the functionality and architecture of FIGS. 1-3. Of course, however, the method 400 may be carried out in any desired environment. Further, the aforementioned definitions may apply during the present description.

As shown, a plurality of application parameters are identified. See operation 402. In the context of the present description, an application parameter refers to any modifiable and/or selectable information associated with an application. For example, in various embodiments, the application parameter may include, but is not limited to, an application setting (e.g. sound quality, etc.), a graphics parameter (e.g. anti-aliasing, resolution, glow, HDR quality, filtering, grass, texture resolution, water quality, sound, etc.), and/or any other application parameter that meets the above definition.

Additionally, the application is defined as a parameterized mathematical function. See operation 404. As an option, the mathematical function may include an application build function. In the context of the present description, an application build function refers to any function that defines an application in terms of parameters which may be configured (e.g. set, etc.).

Furthermore, a plurality of application settings are determined utilizing the mathematical function. See operation 406. Strictly as an option, the determining may be performed utilizing a graphics processor. In other embodiments, the determining may be performed using any number of devices (e.g. a CPU, etc.).

Figure 5:
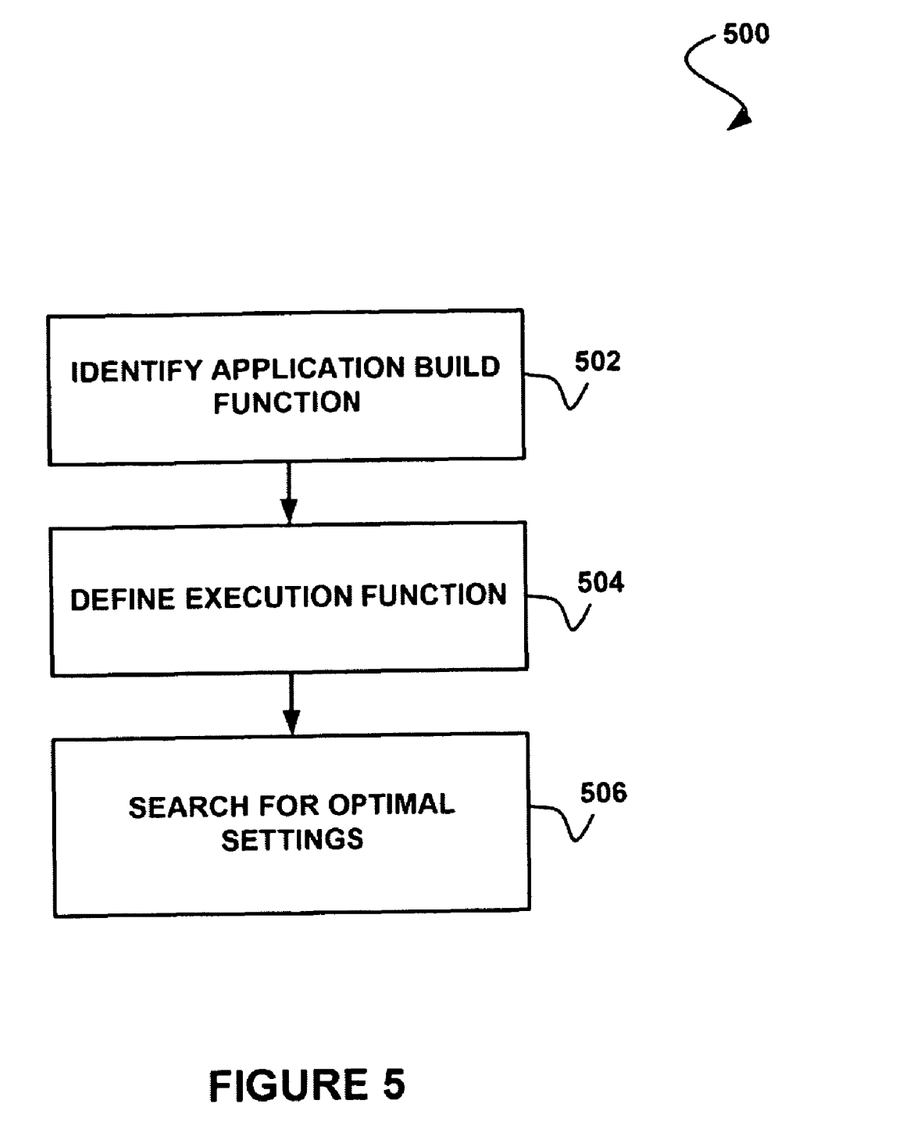
FIG. 5 shows a method for determining a plurality of application settings utilizing a mathematical function, in accordance with another embodiment.

FIG. 5 shows a method 500 for determining a plurality of application settings utilizing a mathematical function, in accordance with another embodiment. As an option, the present method 500 may be implemented in the context of the functionality and architecture of FIGS. 1-4. Of course, however, the method 500 may be carried out in any desired environment. Again, the aforementioned definitions may apply during the present description.

As shown, an application build function is identified. See operation 502. For example, each build of an application (e.g. a game, etc.) may be viewed as a different multi-variate function, where the application parameters may be any parameter corresponding to the application (e.g. resolution, glow, etc.). In one embodiment, the application build function may use these parameters and returns performance data. One example of an application build (e.g. a game build, etc.) with the above mentioned parameters may have the form illustrated in Equation 1.

$$F = B(x1, x2, x3) \quad \text{Equation 1}$$

In this case, B represents the application build function, and x1, x2, and x3 represent various parameters associated with the application. In one exemplary embodiment, B may represent an application build function for a game (e.g. a game build function). In this case, x1 may represent resolution, x2 may represent anti-aliasing, and x3 may represent glow. In either case, F is the resulting performance data. In general, any application build function may be represented by $B(x1, x2, \ldots xN)$, where N is an integer.

Once the performance data is obtained from an application run (i.e. a test) with specific settings, the data is analyzed and it is determined if the application is sufficiently operable at these settings. For example, in the case of a game, it is determined whether the game is playable with these settings. If the game is playable, or the application is sufficiently operable, it is determined whether the settings are the optimal settings.

In the context of the present description, sufficiently operable (or playable) refers to meeting a minimum set of performance criteria for the duration of a test. Such performance criteria may be determined manually or automatically. Additionally, the performance criteria may vary depending on the application. For example, in the case that the application is a game, a specific set of performance criteria may set criteria such that the frames per second (FPS) is never less than a number N, and that an average FPS for a test is not less than a number M.

Additionally, in the case of gaming, performance may be balanced with image quality. For example, if the average FPS is over a certain number, then it may be determined that there is room to increase image quality while still maintaining playability. Continuing with this example, a setting of a resolution of 640×480, where anti-aliasing (AA) is set to none, with no anisotropic filtering (AF), playing at 150 FPS, may likely be increased to a resolution of 1280×1024, anti-aliasing of 2xAA, with filtering of 4xFF, while still maintaining playability. Of course, this performance criteria and specific application is described for illustrative purposes only and should not be construed as limiting in any manner.

Furthermore, the above criterion is arbitrary. Certain applications are more demanding than others and may call for various criteria. For example, some games are more demanding of high frame rates (e.g. first person shooter games, etc.) than other games (e.g. real time strategy, etc.). Additionally, certain application publishers may have looser or more stringent requirements for performance than others. Thus, an execution function may be identified to alter the performance criteria to meet the specifics of the application under test. See operation 504.

In the context of the present description, an execution function refers to any function that defines whether an application may adequately execute given certain settings. In one embodiment, the execution function may include a playable function. In this case, the execution function may be a function of performance data.

For example, in the context of gaming, the execution function may be a function that uses the performance data (e.g. FPS) captured during the test run and returns "0" if the settings are optimally playable, a negative value if the settings are not optimally playable, and positive number if the settings are "too" playable. Equation 2 shows an execution function in accordance with one exemplary embodiment.

$$pl(F) = \begin{cases} F_a - 25, & \text{if } F_a \geq 15 \text{ and } F_a - 25 > F_m - 15 \\ F_m - 15, & \text{else} \end{cases} \quad \text{Equation 2}$$

In this case, "pl" represents the playable function, "F" represents the captured performance data, "Fa" represents the average FPS from the performance data, and "Fm" represents the minimum FPS from the performance data. Again, this is only one specific embodiment, and should not be construed as limiting.

Once the execution function has been identified, the execution may be utilized to search for optimal settings for the application. See operation 506. In one embodiment, the application settings may be determined by identifying parameter settings that result in the composition of the application build function and the execution function being less than a predetermined threshold value. For example, finding all of the optimal playable settings on a build may include to finding all parameter combinations {x1, x2, . . . , xN} where the composition of the playable function with the application build function is approximately "0" as illustrated in Equation 3.

$$pl(B(x_1, x_2, \ldots, x_n)) \approx 0 \quad \text{Equation 3}$$

As an option, roots of the function shown on the multivariate function in Equation 3 may be found. In other words, the application settings may be determined by determining at least one root of a composition of the application build function and the execution function. This may be accomplished in a variety of ways. In one embodiment, the roots may be found by generating all possible task combinations. After completing all tasks, the results of all of the tasks may be searched and the configurations that produce optimal playable settings may be identified.

In another embodiment, the roots may be determined based on testing. For example, a standard and representative set of performance tasks may be generated with specific configuration settings. Once the tests have been completed, a search for the most playable settings from the completed tests may be implemented using performance criteria. Settings resulting from the search may be enumerated.

In still another embodiment, the roots may be determined utilizing an adaptive algorithm. In this case, the adaptive algorithm may include a domain reduction operation, a parameter prioritization operation, and at least one sampling operation. In the context of the present description a domain reduction operation refers to any operation used to reduce a domain or scope of a set of parameters. Additionally, a parameter prioritization operation refers to any operation, manually or automatic, used to prioritize the parameters. Still yet, a sampling operation refers to any operation utilized to determine whether enough optimal application settings are present.

Figure 6:
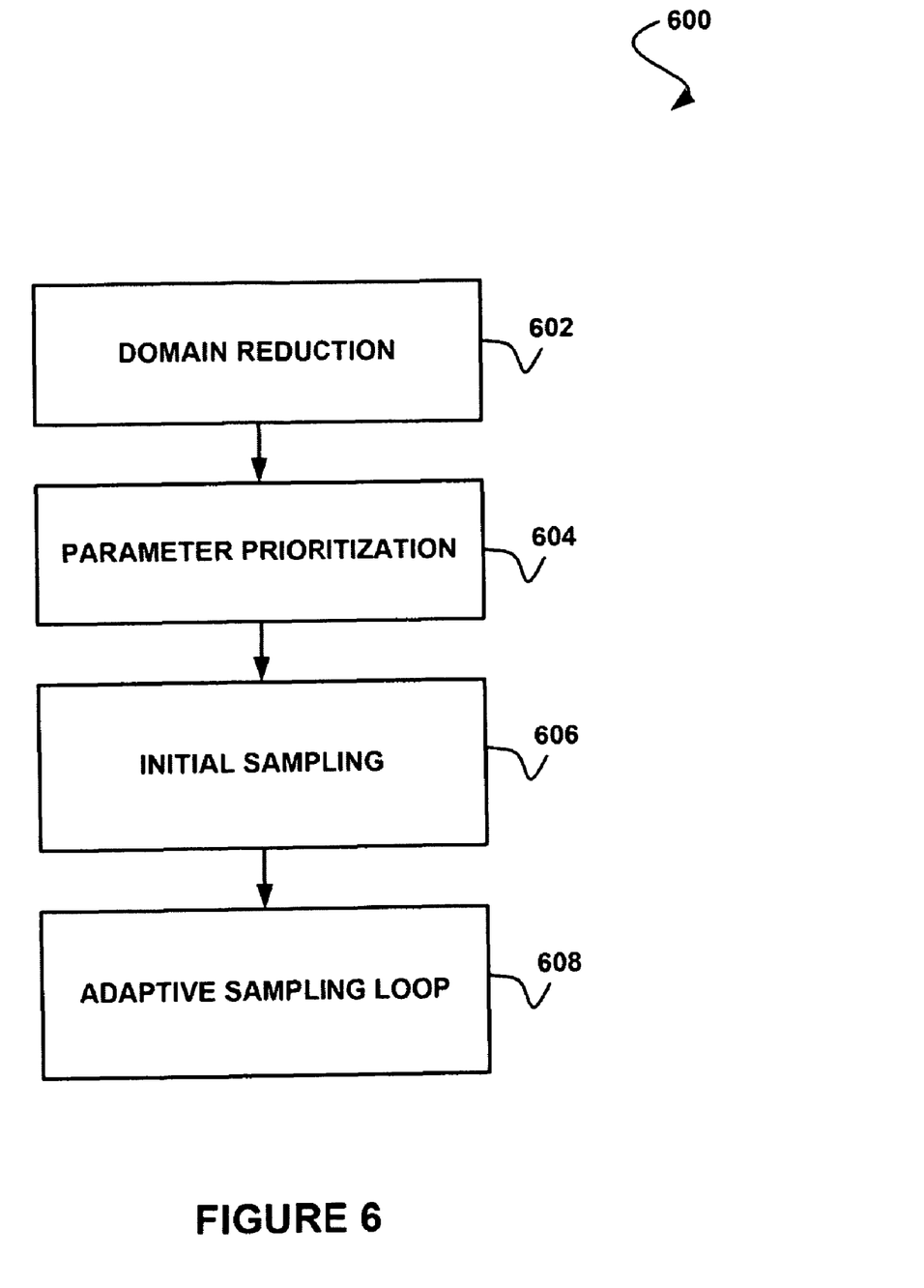
FIG. 6 shows a method for finding application settings using an adaptive algorithm, in accordance with one embodiment.

For example, the execution of each task may be viewed as a point sample in the function illustrated in Equation 3, where the function is iteratively sampled at points in a domain of the function until Equation 3 is satisfied. FIG. 6 shows a method 600 for finding application settings using an adaptive algorithm, in accordance with one embodiment. As an option, the method 600 may be implemented in the context of the functionality and architecture of FIGS. 1-5. Of course, however, the method 600 may be carried out in any desired environment. Again, the aforementioned definitions may apply during the present description.

As shown, the domain of the function illustrated in Equation 3 is reduced. See operation 602. As an option, the domain of the function may be reduced by fixing some variables to constants and reducing the ranges of others. For example, in the case the application is a game, a build with the parameters shown in Table 1 may be present.

TABLE 1

| Resolution | (800 × 600, 1024 × 768, 1152 × 864, 1280 × 960, 1600 × 1200) |
|---|---|
| AA | (off, 2×, 4×) |
| HDR quality | (off, low, high) |
| Filtering | (bilinear, trilinear, anisotropic) |

TABLE 1-continued

| Grass | (off, close, far) |
|---|---|
| Shadows | (off, low, high) |
| Texture resolution | (low, high) |
| Water quality | (low, med, high) |
| Sound | (off, on) |

It should be noted that the parameters may be ordered so that the parameters increase in quality. In the example illustrated in Table 1, the total number of combinations with the parameters is 14580. In other words, there are 14580 possible performance tasks which may be searched for optimal playable settings.

The number of tasks may be reduced greatly by culling out settings intelligently. For example, an experienced tester may evaluate the set of parameters in Table 1 and determine that for a particular system "HDR quality" should always be "off." Also, the tester may determine that grass rendering and shadows are needed and "off" is not an option for "Grass" and "Shadows." Table 2 shows parameters resulting from this intelligent culling. In this way, the total possible number of tasks may be reduced from 14580 tasks to 1080 tasks.

TABLE 2

| Resolution | (800 × 600, 1024 × 768, 1152 × 864, 1280 × 960, 1600 × 1200) |
|---|---|
| AA | (off, 2×, 4×) |
| HDR quality | (off) |
| Filtering | (bilinear, trilinear, anisotropic) |
| Grass | (close, far) |
| Shadows | (low, high) |
| Texture resolution | (low, high) |
| Water quality | (low, med, high) |
| Sound | (off) |

After the domain reduction is completed, the parameters that have more than one possible value are prioritized. See operation 604. In one embodiment, the parameters may be prioritized based on the importance of the parameter from the perspective of the tester. In this way, more samples of the parameters that are deemed more important may be utilized. For example, Table 3 illustrates one choice of priority of parameters (in descending importance), in accordance with one embodiment.

TABLE 3

| 1. | Resolution |
|---|---|
| 2. | AA |
| 3. | Texture Resolution |
| 4. | Filtering |
| 5. | Shadows |
| 6. | Grass |
| 7. | Water quality |

It should be noted that the parameters with only one value left after domain reduction may be excluded since such parameters are constant. In addition to prioritizing the parameters, a default value may be chosen for each parameter. The default value of a parameter may be used for cases where the number of samples is limited and only one point within a dimension of that parameter is possible after biasing the samples based on priority.

Once the domain has been reduced, initial sample points within the search space are determined. See operation 606. At this point, a minimum and maximum number of samples has been identified (e.g. Smin and Smax respectively). In this case, the initial number of samples may be Smin and no more than Smax number of samples will be executed. In one embodiment, all of the corner points of the domain space may be initially sampled. In other words, all combinations of the first and last values of all the non-constant parameters may be sampled. Using the example described in the context of Tables 1-3, such sampling would result in the parameter values shown in Table 4.

TABLE 4

| Resolution | (800 × 600, 1600 × 1200) |
|---|---|
| AA | (off, 4×) |
| Texture resolution | (low, high) |
| Filtering | (bilinear, anisotropic) |
| Shadows | (low, high) |
| Grass | (close, far) |
| Water quality | (low, high) |

In general, this sampling results in 2n number of initial samples where n is the number of non-constant parameters. In this particular case, n=7 resulting in 128 initial samples. If 2n<Smin, the number of samples may be reduced by setting enough of the least important parameters to their default constant values for the initial sampling. For example, if Smin=32, then n=5. By setting "Grass" and "Water quality" to constants, the initial sample set shown in Table 5 is obtained. It should be noted that, in this case, Smin is a power of 2 and has a value of at least 2.

TABLE 5

| Resolution | (800 × 600, 1600 × 1200) |
|---|---|
| AA | (off, 4×) |
| Texture resolution | (low, high) |
| Filtering | (bilinear, anisotropic) |
| Shadows | (low, high) |

After the initial samples are taken, the results are analyzed and new tasks are generated iteratively using an adaptive sampling loop. See operation 608. One exemplary implementation of the adaptive sampling loop is illustrated below in Table 6.

TABLE 6 while($S_{total} \leq S_{max}$)
{
  if(FoundEnoughOptimalSettings( ))
    break;
  DetermineNewPoints( );
  SampleNewPoints( );
}

In this example, "Stotal" is the current number of samples taken. Additionally, the operation "FoundEnoughOptimalSettings( )" determines whether the number of optimal settings found (i.e. tasks where Equation 3 is satisfied) is enough to stop searching. As an option, this may be a check against some minimum number of settings determined by a tester. Further, the operation "DetermineNewPoints( )" analyzes the samples already taken, and identifies new sample points that are most likely to contain optimal settings. It should be noted that the distribution of new points may be biased based on the priority of the various parameters. Still yet, the operation "SampleNewPoints( )" creates new tasks from the points determined by the operation "DetermineNewPoints( )" and waits for the tasks to complete.

Further information and details regarding determining roots for functions may be found with reference to a co-pending U.S. patent application Ser. No. 12/001,503 entitled "SYSTEM, METHOD, AND COMPUTER PROGRAM PRODUCT FOR DETERMINING AT LEAST ONE ROOT OF AN N-DIMENSIONAL FUNCTION, UTILIZING TRI-ANGULATION," which was filed coincidentally herewith and names common inventors, and which is incorporated herein by reference in its entirety.

Figure 7:
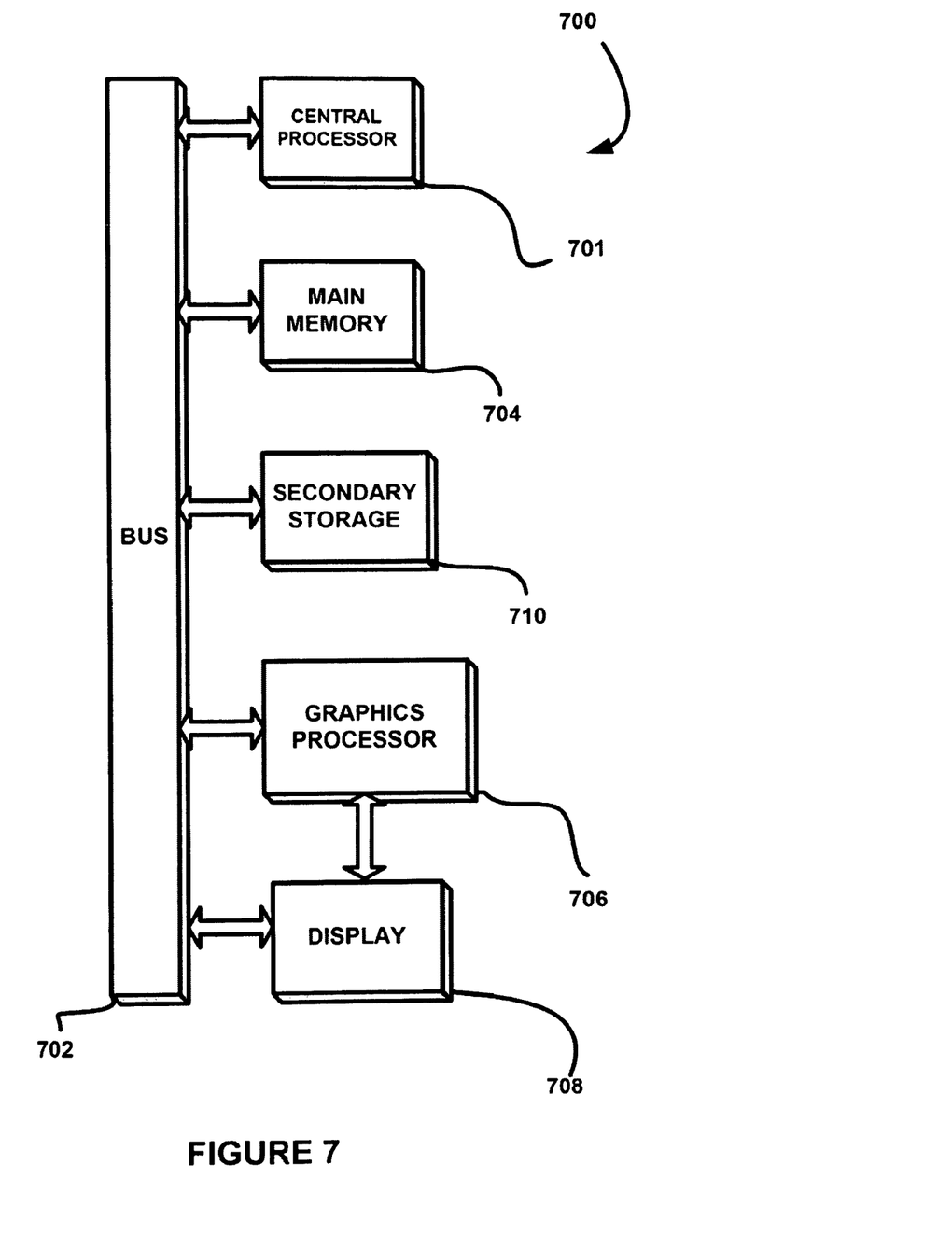
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. In one embodiment, for example, the system 200 of FIG. 2 may take the form shown in FIG. 7. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant device, a mobile phone device, a television, etc.

Further, while not shown, the system 700 may be coupled to a network [e.g. a telecommunications network, local area network, wireless network, wide area network such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying, utilizing a processor, a plurality of hardware specifications associated with a system;
identifying at least one application associated with the system;
identifying a plurality of application parameters based on the plurality of hardware specifications;
defining the plurality of application parameters as a mathematical build function such that the mathematical build function defines the at least one application in terms of the identified plurality of application parameters; and
determining a plurality of application settings, utilizing the mathematical build function, wherein the plurality of application settings are determined by identifying a plurality of application parameter settings that result in a composition of the application build function and an execution function being less than a predetermined threshold value; wherein the plurality of application parameters is determined by querying a database storing the application parameters, the database storing the application parameters including the hardware specification associated with the system such that the hardware specification includes an optimized application setting corresponding to the hardware specification.

2. The method of claim 1, wherein the parameters include settings.

3. The method of claim 1, wherein the parameters include graphics parameters.

4. The method of claim 1, wherein the parameters include at least one of resolution, anti-aliasing, and glow.

5. The method of claim 1, wherein the application parameters include parameters of a game.

6. The method of claim 1, wherein the mathematical function includes an execution function.

7. The method of claim 6, wherein the execution function includes a playable function.

8. The method of claim 6, wherein the execution function is a function of performance data.

9. The method of claim 8, wherein performance data reflects frames per second.

10. The method of claim 1, wherein the application settings are determined by determining at least one root of a composition of an application build function and an execution function.

11. The method of claim 10, wherein the at least one root is determined based on testing.

12. The method of claim 10, wherein the at least one root is determined utilizing an adaptive algorithm.

13. The method of claim 12, wherein the adaptive algorithm includes a domain reduction operation, a parameter prioritization operation, and at least one sampling operation.

14. The method of claim 1, wherein the determining is performed utilizing a graphics processor.

15. A computer program product embodied on a non-transitory computer readable medium, comprising:
computer code for identifying a plurality of hardware specifications associated with a system;
computer code for identifying at least one application associated with the system;
computer code for identifying a plurality of application parameters based on the plurality of hardware specifications;
computer code for defining the plurality of application parameters as a mathematical build function such that the mathematical build function defines the at least one application in terms of the identified plurality of application parameters; and
computer code for determining a plurality of application settings, utilizing the mathematical build function, wherein the plurality of application settings are determined by identifying a plurality of application parameter settings that result in a composition of the application build function and an execution function being less than a predetermined threshold value;
wherein the computer program product is operable such that the plurality of application parameters is determined by querying a database storing the application parameters, the database storing the application parameters including the hardware specification associated with the system such that the hardware specification includes an optimized application setting corresponding to the hardware specification.

16. The computer program product of claim 15, wherein the computer code are associated with a driver.

17. An apparatus, comprising:
a processor; and
a driver for controlling the processor to:
identify a plurality of hardware specifications associated with a system,
identify at least one application associated with the system,
identify a plurality of application parameters based on the plurality of hardware specifications,
define the plurality of application parameters as a mathematical build function such that the mathematical build function defines the at least one application in terms of the identified plurality of application parameters, and
determine a plurality of application settings, utilizing the mathematical build function,
wherein the plurality of application settings are determined by identifying a plurality of application parameter settings that result in a composition of the application build function and an execution function being less than a predetermined threshold value;
wherein the apparatus is operable such that the plurality of application parameters is determined by querying a database storing the application parameters, the database storing the application parameters including the hardware specification associated with the system such that the hardware specification includes an optimized application setting corresponding to the hardware specification.

18. The apparatus of claim 17, wherein the processor is coupled to memory via a bus.

19. The method of claim 9, wherein the performance data set criteria such that the frames per second is never less than a first number, and that an average of the frames per second is not less than a second number.

20. The method of claim 1, further including determining that at least one identified application parameter is not configurable and removing the at least one identified application parameter determined to be not configurable from a list of configurable application parameters, and, after the at least one identified application parameter determined to be not configurable has been removed from the list of configurable application parameters, prioritizing application parameters in the list of configurable application parameters.

* * * * *

UNITED STATES PATENT AND TRADEMARK OFFICE
CERTIFICATE OF CORRECTION

PATENT NO. : 8,276,133 B1  
APPLICATION NO. : 12/001504  
DATED : September 25, 2012  
INVENTOR(S) : Lebaredian et al.

Page 1 of 1

It is certified that error appears in the above-identified patent and that said Letters Patent is hereby corrected as shown below:

In the claims:
  Claim 6, col. 11, line 45; please replace "mathematical" with --mathematical build--;
  Claim 6, col. 11, line 46; please replace "an" with --the--;
  Claim 10, col. 10, line 54; please replace "root of a" with --root of the--;
  Claim 10, col. 10, line 55; please replace "an application" with --the application--;
  Claim 10, col. 10, line 55; please replace "an execution" with --the execution--.

Signed and Sealed this
Twenty-third Day of April, 2013

Teresa Stanek Rea
*Acting Director of the United States Patent and Trademark Office*